United States Patent
Sloss (10) Patent No.: US 11,579,288 B2
(45) Date of Patent: Feb. 14, 2023

(54) PSEUDO RANDOM FREQUENCY SONAR PING GENERATION

(71) Applicant: CODA OCTOPUS GROUP INC., Orlando, FL (US)

(72) Inventor: Martyn Sloss, Fife (GB)

(73) Assignee: CODA OCTOPUS GROUP INC., Orlando, FL (US)

( * ) Notice: Subject to any disclaimer, the term of this patent is extended or adjusted under 35 U.S.C. 154(b) by 366 days.

(21) Appl. No.: 15/953,423

(22) Filed: Apr. 14, 2018

(65) Prior Publication Data
US 2019/0317211 A1  Oct. 17, 2019

(51) Int. Cl.
*G01S 15/10* (2006.01)
*G01S 15/89* (2006.01)

(52) U.S. Cl.
CPC ............. *G01S 15/102* (2013.01); *G01S 15/89* (2013.01)

(58) Field of Classification Search
None
See application file for complete search history.

(56) References Cited

U.S. PATENT DOCUMENTS

| | | | | |
|---|---|---|---|---|
| 3,371,196 A * | 2/1968 | Lerwill | ............... | G01V 1/366 708/817 |
| 4,086,560 A * | 4/1978 | Johnston | ............... | G01S 15/32 367/1 |
| 4,851,848 A * | 7/1989 | Wehner | ............... | G01S 13/24 342/25 D |
| 4,955,002 A * | 9/1990 | Campbell | ............... | G01S 7/526 367/100 |
| 5,014,235 A * | 5/1991 | Morton | ............... | G06F 17/16 365/185.11 |
| 6,556,639 B1 * | 4/2003 | Goldston | ............... | H04H 60/07 375/365 |
| 6,867,720 B1 * | 3/2005 | Freeman | ............... | G01S 7/52028 341/143 |
| 2009/0310438 A1 * | 12/2009 | Sloss | ............... | G01S 15/89 367/7 |
| 2011/0110194 A1 * | 5/2011 | Sloss | ............... | G01S 7/6245 367/88 |
| 2014/0064032 A1 * | 3/2014 | Sloss | ............... | G01S 7/52003 367/88 |
| 2014/0064033 A1 * | 3/2014 | Sloss | ............... | G01S 7/6245 367/107 |

(Continued)

FOREIGN PATENT DOCUMENTS

| | | | | | |
|---|---|---|---|---|---|
| EP | | 3553554 A1 * | 10/2019 | ........... | G01S 7/5273 |
| WO | WO-2007050289 A1 * | | 5/2007 | ........... | G01S 15/104 |

OTHER PUBLICATIONS

Nakahira, K., et al. "A self-adapting sonar ranging system based on digital polarity correlators." Measurement Science and Technology 15.2 (2003): 347. (Year: 2003).*

(Continued)

*Primary Examiner* — Isam A Alsomiri
*Assistant Examiner* — Jonathan D Armstrong
(74) *Attorney, Agent, or Firm* — Barnes & Thornburg LLP (57) ABSTRACT

In a sonar system using a large array multielement sonar detector to detect reflected signals sent out by a sonar ping generator, the sent out sonar ping generator sends out varying frequency sonar signals during each ping, where the frequency is neither monotonically increasing or monotonically decreasing.

5 Claims, 6 Drawing Sheets

(56) References Cited

U.S. PATENT DOCUMENTS

| | | | | |
|---|---|---|---|---|
| 2017/0123061 A1* | 5/2017 | Sloss | ....................... | G01S 15/89 |
| 2017/0315235 A1* | 11/2017 | Steenstrup | .......... | G01S 15/8902 |
| 2019/0265343 A1* | 8/2019 | Sloss | ....................... | G01S 7/533 |
| 2019/0346565 A1* | 11/2019 | Sloss | ....................... | G01S 7/533 |

OTHER PUBLICATIONS

W. Fischer, Digital Video and Audio Broadcasting Technology, Signals and Communication Technology, 3rd ed., DOI 10.1007/ 978-3-642-11612-4_13, © Springer-Verlag Berlin Heidelberg 2010 (Year: 2010).*

TI Designs SONAR Receiver Path Sub-System Reference Design Using the AFE5809. TIDU702—Nov. 2015 (Year: 2015).*

Kodama, Tetsuji, et al. "Application of digital polarity correlators in a sonar ranging system." IEEJ Transactions on Electronics, Information and Systems 127.3 (2007): 317-323. (Year: 2007).*

\* cited by examiner

Fig. 10

PSEUDO RANDOM FREQUENCY SONAR PING GENERATION

RELATED PATENTS AND APPLICATIONS

The following US patents and US patent applications are related to the present application: U.S. Pat. No. 6,438,071 issued to Hansen, et al. on August 20; U.S. Pat. No. 7,466,628 issued to Hansen on Dec. 16, 2008; U.S. Pat. No. 7,489,592 issued Feb. 10, 2009 to Hansen; U.S. Pat. No. 8,059,486 issued to Sloss on Nov. 15, 2011; U.S. Pat. No. 7,898,902 issued to Sloss on Mar. 1, 2011; U.S. Pat. No. 8,854,920 issued to Sloss on Oct. 7, 2014; and U.S. Pat. No. 9,019,795 issued to Sloss on Apr. 28, 2015; U.S. patent application Ser. Nos. 14/927,748 and 14/927,730 filed on Oct. 30, 2015 and Ser. No. 15/908,395 filed on Feb. 28, 2018 by Sloss are also related to the present application.

The above identified patents and patent applications are assigned to the assignee of the present invention and are incorporated herein by reference in their entirety including incorporated material.

FIELD OF THE INVENTION

The field of the invention is the field of insonifying a body of fluid with sonar pulses (pings) and measuring the sonar ping reflection from sparse objects in the fluid.

OBJECTS OF THE INVENTION

It is and object of the invention to insonify a fluid with sonar ping pulses having varying frequencies within the ping, and to recover position information regarding objects in the fluid which reflect the sonar ping pulses.

SUMMARY OF THE INVENTION

One or more objects immersed in a fluid are imaged by directing a sonar ping pulse at the object and recording sonar signals reflected from the object(s) with a sonar imaging array. The data calculated from the reflected sonar signals is used to produce a sonar image of the object(s). The data are advantageously measured and calculated if the sonar ping pulse has a frequency variation both increasing and decreasing during the ping pulse. The most preferred method of the invention is when both the frequencies and positions during the pulse are pseudo randomly distributed.

DETAILED DESCRIPTION OF THE INVENTION

It has long been known that data presented in visual form is much better understood by humans than data presented in the form of tables, charts, text, etc. However, even data presented visually as bar graphs, line graphs, maps, or topographic maps requires experience and training to interpret them. Humans can, however, immediately recognize and understand patterns in visual images which would be impossible for even the best and fastest computers to pick out. Much effort has thus been spent in turning data into images.

In particular, images which are generated from data which are not related to light are difficult to produce. One such type of data is sonar data, wherein a sonar signal pulse is sent out from a generator into a volume of fluid, and reflected sound energy from objects in the insonified volume is recorded by one or more detector elements. The term "insonified volume" is known to one of skill in the art and is defined herein as being a volume of fluid through which sound waves are directed. In the present invention, a sonar signal pulse of sound energy waves called a ping is sent out from an ultrasonic sonar generator which insonifies a roughly conical volume of water.

Figure 1:
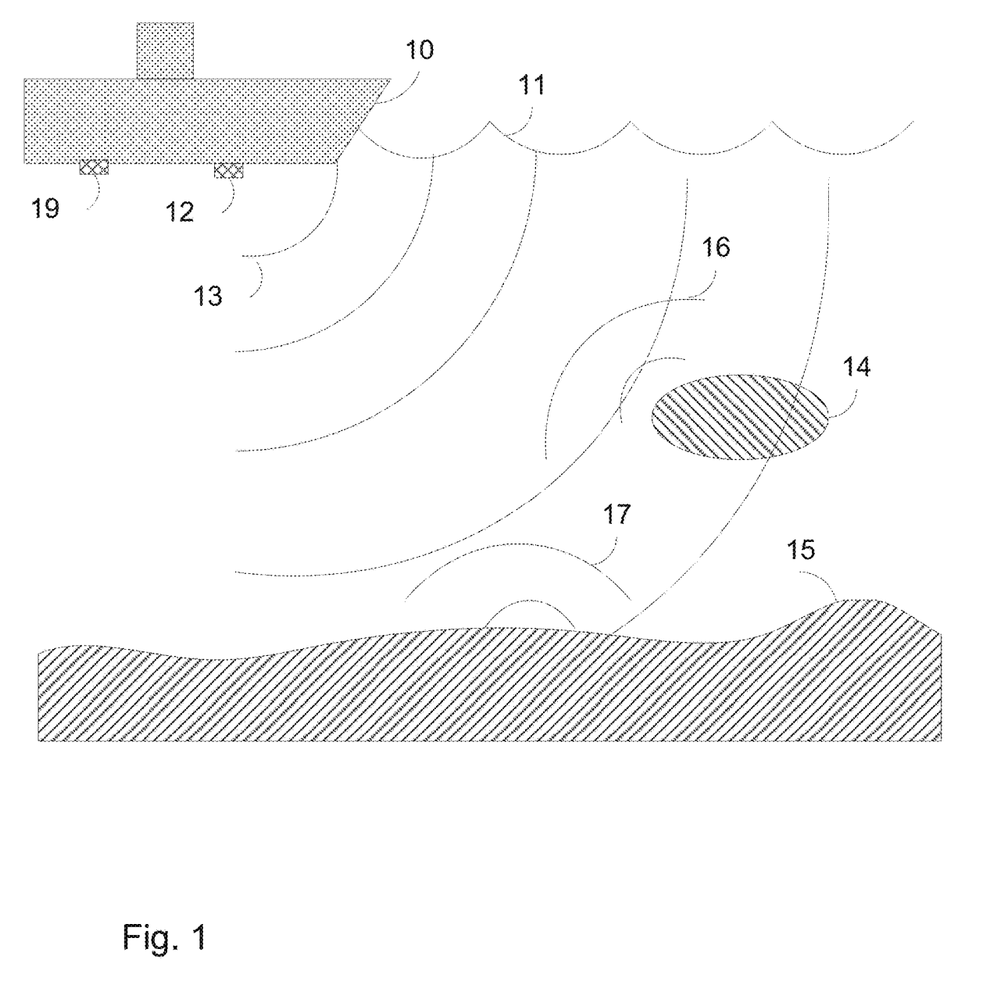
FIG. 1 shows a sketch of a sonar source sending sonar wave to a surface and a sonar array receiving device receiving reflected sonar signals from the surface.

FIG. 1 shows a sketch of a vessel 10 carrying an ultrasonic sonar generator or ping generator 12 under the water. The outgoing sound waves 13 of an outgoing ping impinge on an object 14 suspended in the water, sound waves 16 are reflected back towards a multielement sonar detector 19. Object 14 may be suspended in the water, lying on the seabed 15, or be buried in the sea bed 15. Sound waves 17 are also shown reflected from the seabed 15 towards the sonar detector 19. Sound waves 16 and 17 may also be rereflected (not shown) from the surface 11 of the water. A series of outgoing ping pulses may be sent out with an outgoing ping frequency $P_f$. A sonar ping of the prior art generally has a constant sound frequency f. (The frequency f is sometimes changed in the prior art during the ping in a method called a chirped pulse ping, where the pulse frequency either increases or decreases monotonically throughout the pulse.) A master oscillator (not shown) of the prior art produces a square wave voltage output at frequency f, and the ping generator of the prior art uses the master oscillator to produce outgoing sinusoidal sound waves in phase with the master oscillator. The outgoing ping length $l_p$ and the outgoing ping time $t_p$ are related by the speed of sound in the water.

A series of outgoing ping pulses may be sent out with a ping frequency $P_f$. Sound waves 13 are shown propagating as a cone shaped beam towards the object 14. The reflected sound waves 16 are received by each detector element of a multielement sonar detector array 19, which measures the pressure of the reflected ping sound waves at each element and returns an analog electrical voltage signal representing the amplitude versus time of the sound wave impinging on the element.

The reflected ping signals may be subdivided into a series of slices having a slice time $t_s$.

The analog electrical voltage signal from each detector element is digitized in the prior art and treated to give raw data representing the reflected sonar wave phase and intensity at each of the multielement detectors elements.

The digitized data is then transformed with a beamformer program to provide points in three dimensional space polar coordinates as a function of range and of two orthogonal angles from the detectors. These points in polar coordinate space are in turn generally presented as data in a three dimensional Cartesian coordinate space. The point data may then be presented as height above the sea bed, for example, or depth below the surface, as a "z" coordinate, while the x and y coordinates could be chosen as west and north, for example. In other examples, the x or y coordinate could be chosen to be parallel to a wall or other long, mostly straight object.

One characteristic of sonar data is that it is very sparse, as the ensonified volume is generally water having only one or a few objects of interest. The volume of the fluid is generally divided into a series of cubes in three dimensional Cartesian coordinate space, and data is returned from a small percentage of the cubes having sides of length $l_s$. The resolution of the sonar image is inversely proportional to the linear dimension $l_s$ of the cubes, while the computation cost of recording the signal from each detector element and calculating from whence the signals have come is inversely proportional to the cube dimensions to the third power. There is then a tradeoff between resolution and computer power and time taken to produce an image from received data.

In other electromagnetic or ultra sound imaging technologies, the data are very dense. In an art unrelated to sonar imaging, medical imaging essentially has signals from each voxel, and the techniques for such imaging as CT scans, MRI scans, PET scans, and Ultrasound Imaging is not applicable to the sparse sonar data. In the same way, signals from sound waves sent out from the earths surface into the depths of the earth to return data of rock formations in the search for oil and gas produce dense data, and techniques developed for such fields would not in general be known or used by one of skill in the art of sonar imaging.

A prior invention by the inventor of the present invention (U.S. patent application Ser. No. 15/908,395 filed on Feb. 28, 2018) provides a novel method to reduce the amount of raw data from sonar detecting array that is sent to the beamformer section or to a data storage system in, for example, a remotely operated vehicle (ROV).

The most preferred embodiments of the above identified invention use cheaper comparator circuits instead of more expensive ADC circuits to both record the raw data and to provide a compressed data set for storage or transmission to the a location separated from the sonar ping generator and detector array (Top End). The inventor has shown that the most important data is the relative phase of the reflected sonar ping pulse compared to the sent out ping pulse. The inventor has shown also that 1 bit Real+1 bit Imaginary Data (=2 bits) which gives 4 possible phase values corresponding to the 4 quadrants of the phase diagram determines the quadrant of the phase vector for each of the hydrophones in the array can give acceptable data for imaging while reducing the electronic equipment, storage, and transmission costs. The inventor has also shown that using just the imaginary part of 2 bit data which gives a result either in the top half (positive) or bottom half (negative) of the phase diagram can be used to further reduce the amount of data stored and used.

The present invention uses the techniques of the prior invention to further refine the results and to allow more flexibility and the use of multiple simultaneous ping generators and multiple detector arrays. Instead of sending out a constant frequency ping, or a frequency chirp ping, of the prior art, a pseudo random frequency ping is used. When the returned ping is convolved with the sent out ping, the maximum of the convolution will give the data required for the beam forming section.

It is difficult to tell a priori how to choose a frequency sent out pattern which will be optimal for the various conditions of use. Indeed, the concept of frequency is rather misleading when the frequency changes rapidly and the frequency is both increasing and decreasing rapidly at different times during the ping. Normally, the frequency can be measured by counting the time between maxima or minima in the signal, or more accurately the time between zero crossings of the signal. For the purpose of this disclosure, the instantaneous frequency of the sonar ping is defined as the inverse of the time between two zero crossings as the pressure increases and decreases around the long term mean pressure. We therefore may have two frequencies defined for each "cycle" of a "positive" and "negative" part. Since the technology does not measure the analog voltages, and only compares digital ones and zeros (or more usefully, ones and minus ones), it is useful to think of a sent out signal as a series of either ones and zeros or ones and minus ones. For example, a signal represented by the string
1010101010101010101010101010101010101010
would correspond to a sine wave at, say, 375 KHz, while the signal
11001100110011001100110011001100110011001100 . . . . .
would correspond to a sine wave at half that frequency and a signal
1010101010110011001100 . . . . .
would correspond to a 5 cycles at one frequency followed by two cycles at a half frequency.

The inventor has proposed that all possible strings formed by combinations of a number K of zeros and ones be computer generated, and the convolutions of each string with itself be filtered according to a criterion to produce a set of strings optimized for the conditions to be found in the field. In addition, each string in the optimized set may be convolved with all the others in the optimized set to find subsets of strings each of which convolve to a sufficiently low number with any of the others. Such groups of strings are then used with multiple senders and receivers and little or no interference when the sent out and received signals overlap.

The inventor anticipates that any regularity or repeating patterns in the investigated strings will be rejected by the selection process and that the pattern of ones and zeros in the strings in the selected sets will appear random. We define the patterns so generated as pseudo random, since there will be a finite number of strings meeting the criteria and no finite number may be truly random. For the purposes of this disclosure, the pattern of sent out frequencies is defined to be pseudo random.

The concept of a pseudo random set of frequencies is well defined in radio frequency sent out waves, which by definition are chosen that they do not cause unacceptable interference with other sent out patterns.

The inventor anticipates values of K such as 32, 64, or 128, for example, or indeed any number convenient for the anticipated conditions such as range, noise, and processing power available.

For the present invention, a convenient slice length $l_s$ is 4 cm and a convenient ping length $l_p$ is about 12 "cycles" of a sound wave having a frequency varying in a range about 375 KHz. The reflected ping signals may be subdivided into a series of slices having a slice time $t_s$ and a slice length $l_s$.

As an example, we send out the pulse every 0.1 s. We have an array of 2304 hydrophones arranged as a 48×48 array. Each hydrophone receives the approximately 375 KHz frequency shifting sound wave reflected sound from the insonified volume in front of the transmitter.

Figure 2A:
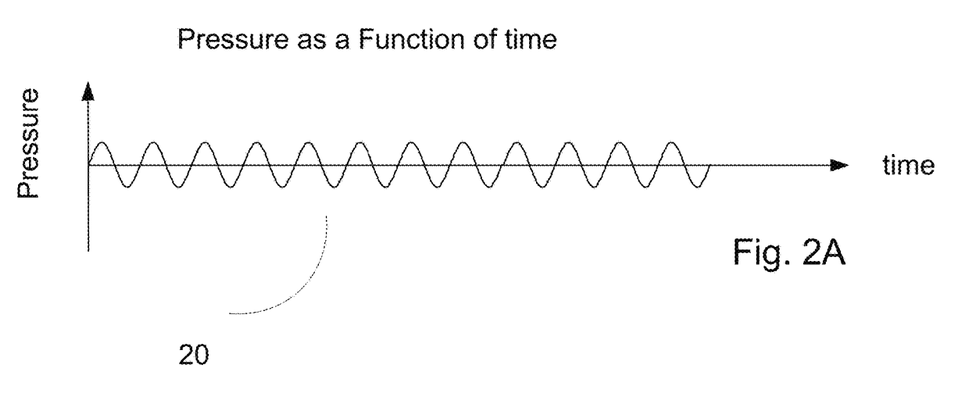
FIG. 2A shows a graph of a single frequency sonar ping pressure signal 20 sent out from the sonar ping generator 12.

FIG. 2A shows a graph of a single frequency sonar ping pressure signal 20 sent out from the sonar ping generator 12.

Figure 2B:
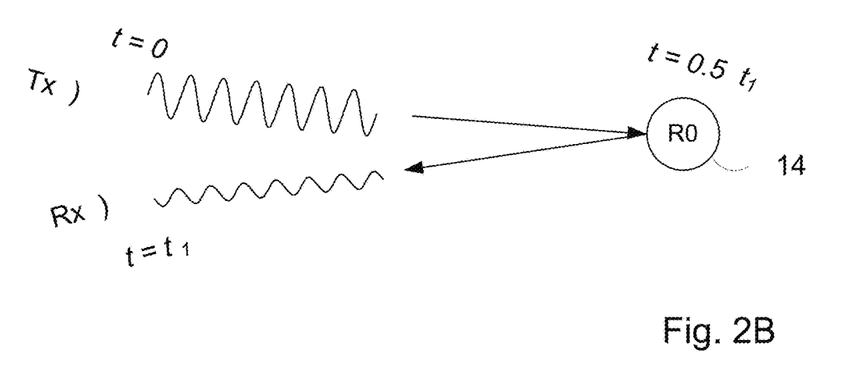
FIG. 2B shows a sketch the relative positions of the ping generator 12, the ping receiver 19 and the object 14.

FIG. 2B shows a sketch the relative positions of the ping generator 12, the ping receiver 19 and the object 14. If the ping generator 12 transmits a pulse of energy Tx) at time t=0, some of this will we reflected by the object 14 (R0) and will be picked up by the receiver Rx) at time $t=t_1$. The distance from Tx to R0 to Rx can be calculated by multiplying the time $t_1$ between the transmitted pulse and the received pulse by the speed of sound through the medium (eg. water=~1500 m/s).

Figure 3:
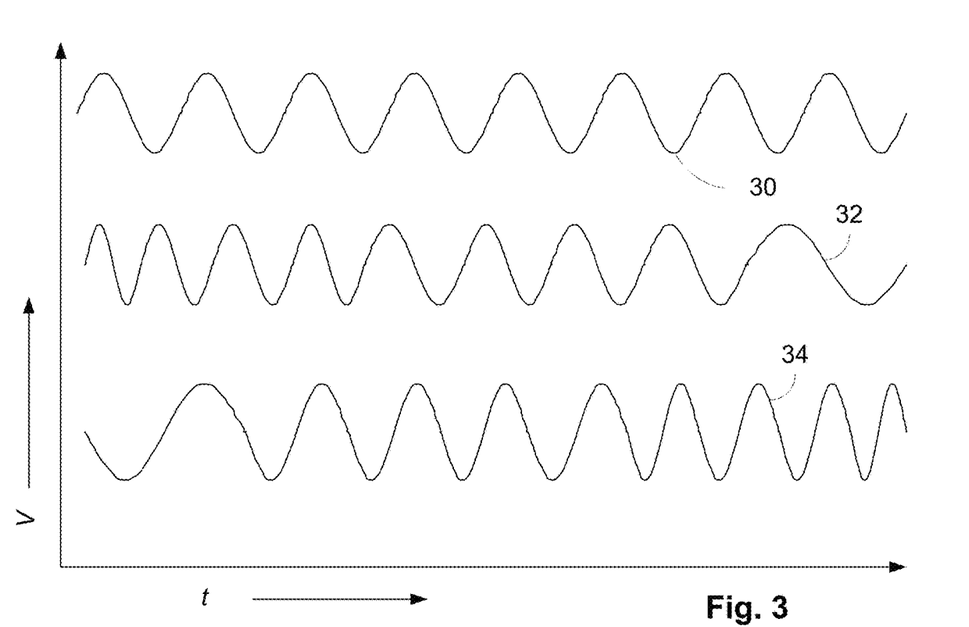
FIG. 3 shows three prior art signal wave forms as voltage vs time.

The accuracy of the range calculation depends on the ability to Identify the Transmit Signal against background noise in the Received Signal so we can get an accurate measurement for time $t_1$. FIG. 3 shows three prior art signal wave forms as voltage vs time. Curve 30 represents a constant frequency, curve 32 is a chirped frequency wave with frequency decreasing in time, and curve 34 represents a chirped frequency increasing in time.

Basically, we are looking in the received signal for patterns that we recognize as associated with the sent out signal. If there were no noise, we would see nothing as a function of time until a reflected wave returned to the detector elements.

For a single reflection from a single surface, we would see the same signal that we sent out, but attenuated by some large factor. Then, we only have to measure the time taken for the sound to go and return to calculate the range of the reflector. There is, however, noise and signals from spurious reflections, etc. It is also difficult to measure the exact start of the received pulse with respect to the start of the sent out pulse.

In an analog world, you want to slide an image of the pattern you are looking for along an image of received signal to search for a matching pattern. You can do the same thing with digital files, as will be shown below.

Prior art systems digitized the analog voltage signals resulting from the incoming signal pressure fluctuations with 10 or 12 bit analog to digital conversion (ADC) circuitry. The signals were then treated with a quadrature encoder to determine the imaginary and real parts of of a representation of the incoming sound wave. The relative phase of the incoming sound wave varies over the face of the detector according to the angle between the surface normal to the detector and the direction of the incoming sound wave. Thus, the direction to the object may be determined by the relative phase pattern, and the time taken for the sound to arrive gives the range of the object.

The present inventor has shown that an adequate measure of the phase of the incoming signal with respect to the transmitted signal may be advantageously recorded by using cheaper digital comparator circuitry instead of more expensive ADC conversion of the incoming signals. Instead of 10 and 12 bit data, the circuitry works with one or two bits of data. The loss of accuracy in angle can be made up by having many more detectors.

In the present invention, the most preferred way to recognize and to measure the time taken to return a reflected signal to a detector is to use a one bit convolution technique. The received signal is passed through a filter to remove the high frequency components, and then blocks of the received signal are chosen as convolution windows and sampled at known times related to the sent out signal. Suppose the sent out signal is represented by a digital string of K one bit numbers (zero or one) numbers. Each of the K numbers of the sent out digital string is compared to a convolution window measurement of M one bit numbers in the received signal, where (M>K).

To begin, the first number in the digital string of K numbers is compared to the first number in the digital string of M numbers. If the numbers match, (both zeros or both ones) a one is added to a register. The process continues in turn for each of the K numbers in the sent out string until the $K_{th}$ number in the string of M received numbers is compared to the $K_{th}$ number in the sent out string of numbers. For each match, a one is added to the number in the register. If the first K numbers in the received string matched the K numbers of the sent out string the number in the register would be K. If the first K numbers in the received string were unrelated to the string of K sent out numbers, the probable number of matches in the register would be predicated to have a statistical distribution with a mean value of K/2, which would be the expected result if two random numbers were compared. The number in the register is recorded, and the register is cleared.

Then, the process is repeated by comparing the first number in the digital string of K numbers to the second number in the digital string of M numbers, adding matches the register, recording the sum, and continuing until the $K_{th}$ number in the sent out string of numbers is compared to the $M_{th}$ number in the string of received M numbers.

Figure 4A:
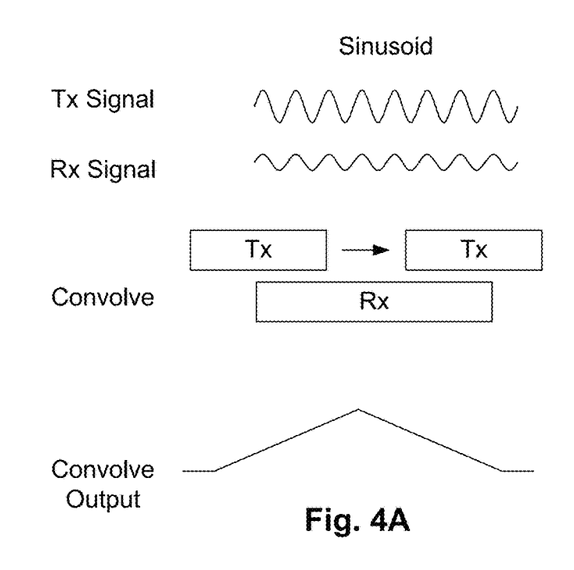
FIG. 4A shows plot of the register values for a constant frequency sinusoidal ping.
Figure 4B:
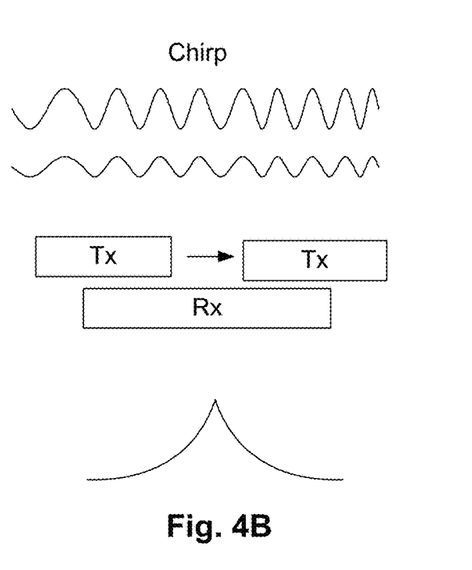
FIG. 4B shows plot of the register values for a chirped frequency sinusoidal ping.

Now, the string of (M−K) register values can be plotted as a function of the integers one to (M−K). If there is a perfect match of K numbers anywhere in the string of M numbers, the plot of the register values will have a maximum value K at some integer value. Depending on the choice of the sent out signal, the graph could show a triangular peak as shown in for uniform sinusoidal pings shown in FIG. 4A or a sharper peak for a chirped signal shown in FIG. 4B.

Figure 5:
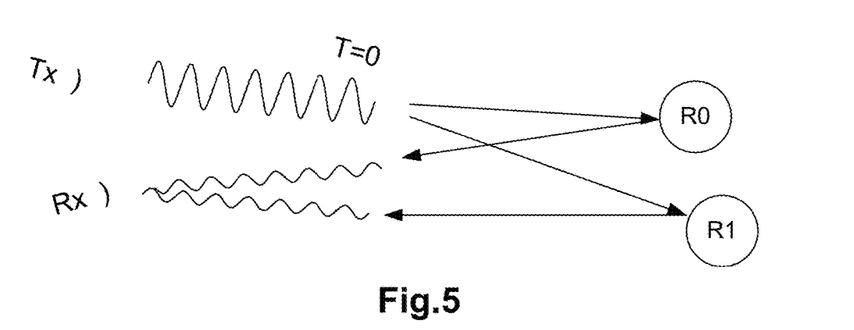
FIG. 5 shows a sketch of reflective objects (R0 and R1) in the ensonified volume.

The problem of determining range is made worse if there are multiple reflective objects (R0 and R1) in the ensonified volume as shown in FIG. 5. If objects R0 and R1 are closer together than the length of the transmit pulse, the received signal will partially consist of the vector sum of the two reflections. There will in general be a phase difference between the two reflections which could make the received sinusoidal signal have intensities ranging from zero to 4 times the intensity of just one reflected signal, depending on the relative phases. If the sent signal has a pseudo random frequency distribution, different parts of the two simultaneously received signals will convolve with the sent out signal and the convolution graph will show two peaks and the difference in ranges will be resolvable.

One solution to the multiple reflection problem is to reduce the length of the transmit pulse. However the shorter the transmit pulse the more susceptible the system is to noise.

Some signals give better convolutions than others. One common technique is to use a 'CHIRP', a signal that changes monotonically in frequency over time. This signal gives a much narrower convolution peak.

Figure 6A:
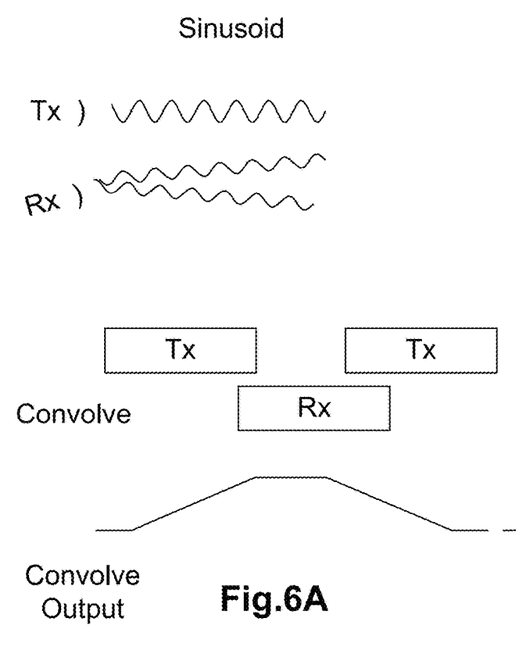
FIG. 6A shows the convolution results for a sinusoidal pulse.
Figure 6B:
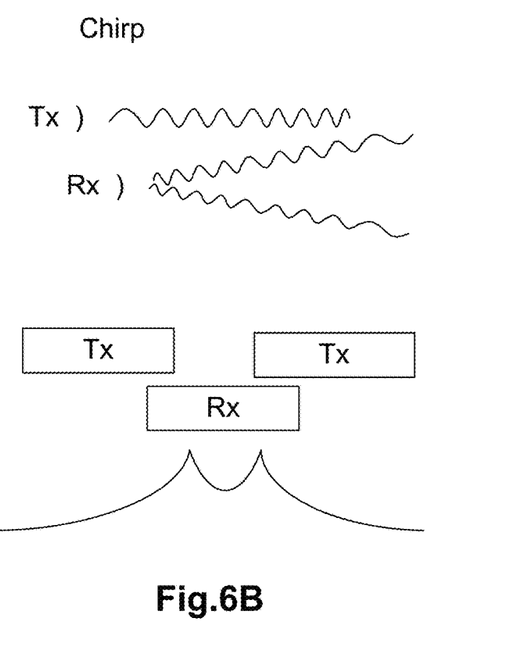
FIG. 6B shows the convolution results for a chirped pulse.

FIGS. 6A and 6B show the convolution results for a sinusoidal pulse and a chirped pulse respectively. The more complicated pulse can better resolve range for two close objects. The 'CHIRP' is also better at identifying multiple overlapping reflected signals.

When the sent out signals have regularities, spurious reflections from various objects, reflections of reflected waves, etc may be read as data. Unfortunately, when a pattern is chosen "by hand", the regularities are hard to see.

The inventor proposes to find patterns of sent out signals where there are no or few regularities which may interfere with the search. The inventor proposes searching a first set S of a large number of possible strings of K numbers and choosing a subset $S_1$ of strings according to a criterion. The most preferred number of members of the set S is all possible strings of length K, starting at 0 0 0 0 . . . . . and ending at 1 1 1 1 . . . . . . The most preferred criterion is that two reflectors having a determined difference in range should be distinguishable. Another criterion is that the area under the single peak showing a single reflection be larger than a determined number.

A subset $S_2$ of $S_1$ is chosen according to a criterion. One criterion is that convolution of any two members of the set $S_2$ should produce a number smaller than a defined number when convolved with each other. If the patterns of two members of the set $S_2$ are sent out at the same time to ensonify the same volume, or to ensonify different volumes where reflections from objects in one volume could be received by a detector observing the other volume, the signals would not interfere nor produce spurious signals in the wrong detector. Thus, for example, a ship could carry two detectors each programmed to look for a different pattern in the received signal. A single ping generator could generate sequential signals of different send out patterns, and thus more pings per second could be sent out. Different ping generators could be used to send pings in different directions, allowing scans of a wider path in the same time. Different ping generators could send out simultaneous pulses to the same area, and two detectors would "see" the same area at the same time, but from differing directions so a three dimensional view of the area could built up.

Figure 7:
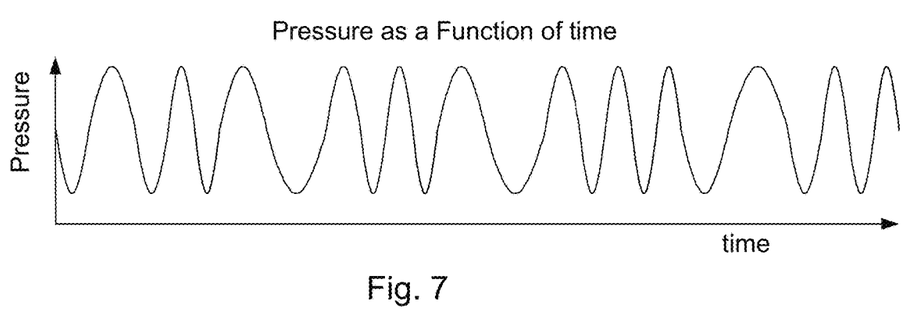
FIG. 7 shows a sketch of a sent out signal having a pattern of increasing and decreasing frequencies
Figure 8:
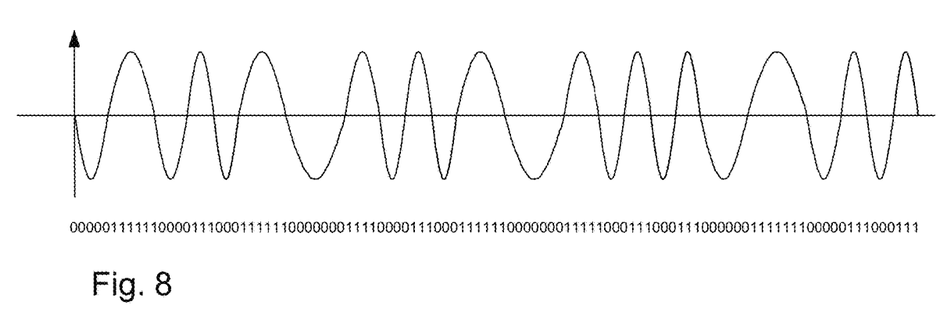
FIG. 8 shows the sketch of FIG. 7 as a pattern of one and zeros, where the zeros are regions where the pressure is below the mean pressure, and the ones are regions where the pressure is above the mean pressure.

FIG. 7 shows a sketch of a sent out signal having a pattern of increasing and decreasing frequencies as defined earlier. FIG. 8 shows the same signal as a pattern of one and zeros, where the zeros are regions where the pressure is below the mean pressure, and the ones are regions where the pressure is above the mean pressure.

Figure 9:
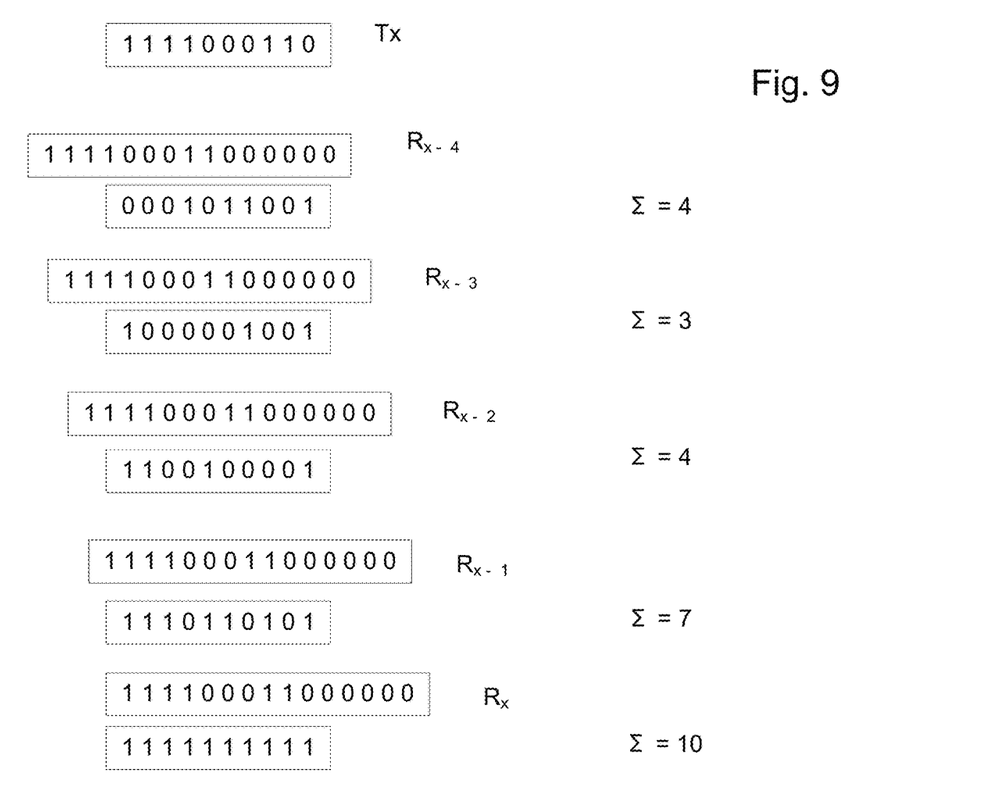
FIG. 9 shows a sketch where a sent out signal Tx having 10 values is compared to a received signal Rx in 5 steps, with the number of matches recorded for each comparison.

FIG. 9 shows a sketch where a sent out signal Tx having 10 values is compared to a received signal Rx in 5 steps, with the number of matches recorded for each comparison step.

Figure 10:
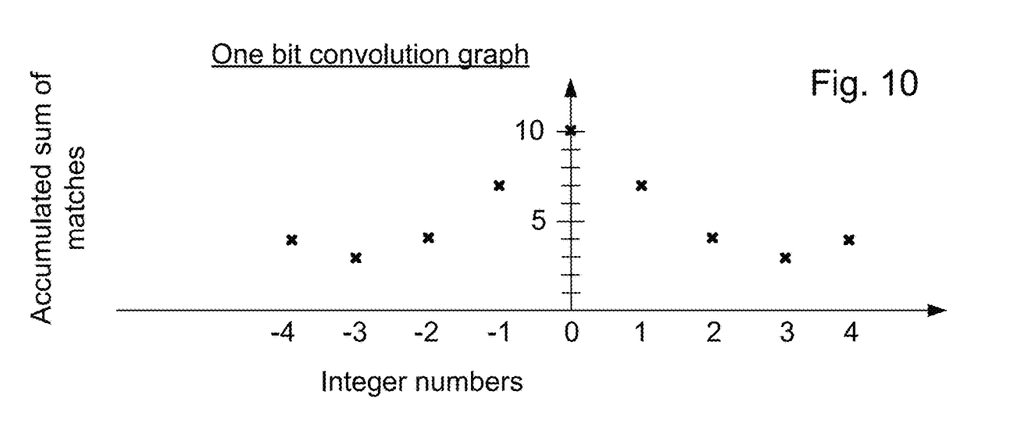
FIG. 10 shows plots the number of matches vs integer step and shows maximum value of 10 where the Tx and Rx signals match.

FIG. 10 shows plots the number of matches vs integer step and shows maximum value of 10 where the Tx and Rx signals match. The plot of the number of matches shows a maximum where the Tx and Rx signals match.

The convolution of the transmit and receive signal requires a reasonable amount of hardware. As an example, say we have a transmit signal divided into 64 parts, and we define a convolution window having 128 parts. (The convolution window may have more parts if the entire slice is not covered).
We need to do a 128 convolutions, (matching the 64Tx values with
Rx(0 . . . 63),Rx(1 . . . 64),Rx(2 . . . 65), . . . Rx(64 . . . 127)
This is 64 times 64 times (1 Multiply+1 Add) per Receive Element.

In order to determine the direction of the Reflector, if we have multiple receive elements, we can use the different ranges from the Tx to R0 to Rx0 and Tx to R0 to Rx1, to work out the direction to R0.

The more Reflectors the more Receive Elements are needed to work out the range and direction of each Reflector.

For an Echoscope we have >2300 Receive elements.
If we are trying to resolve ranges to 5 cm we need to do ~1500 convolutions per second per element.
=~35 Billion Multiply Adds per second.

Typically these sort of calculations are done using 8 to 16 bit Values, which require a lot of hardware and power.

If using 1 bit data a multiply can effectively be done using an Negative Exclusive OR 1 Bit Multiply

| V0 | V1 | V0 * V1 | A | B | A nx or B |
|----|----|---------|---|---|-----------|
| -1 | -1 | 1 | 0 | 0 | 1 |
| -1 | 1 | -1 | 0 | 1 | 0 |
| 1 | -1 | -1 | 1 | 0 | 0 |
| 1 | 1 | 1 | 1 | 1 | 1 |

The result of the accumulate (add) is the sum of the count of the 1's in the convolution. For any convolution window size, the criterion for choosing a bit pattern is that the chosen bit pattern gives the best convolution results.

The convolution of the transmit and receive signal requires calculable amount of hardware. With a Tx of 64 values, and a receive signal Rx convolution window of 128 Values. We need to do a 128 convolutions, (matching the 64Tx values with
Rx(0 . . . 63),Rx(1 . . . 64),Rx(2 . . . 65), . . . Rx(64 . . . 127)
This is 64*64*(1 Multiply+1 Add) per Receive Element. For an Echoscope we have >2300 Receive elements. If we are trying to resolve ranges to 5 cm we need to do ~1500 convolutions per second per element.

If we have a pulse length of 10 cm, we need to have a convolution window of ~50 samples
Which is approx. 2300×1500×50×100×(1 Multipy+1 Add)
=~35 Billion Multiply Adds per second.

Typically these sort of calculations are done using 8 to 16 bit Values, which require a lot of hardware and power.

Ideally the sent out pattern should give a narrow convolution graph (well defined spike having a narrow width with a large area under the spike, as well as give multiple distinguishable spikes if there are multiple reflections.

Obviously, many modifications and variations of the present invention are possible in light of the above teachings. It is therefore to be understood that, within the scope of the appended claims, the invention may be practiced otherwise than as specifically described.

I claim:
1. A method, comprising:
  insonifying, by a generator of a sonar imaging device, a volume of fluid with at least one or a series of sonar pings, wherein the volume of fluid contains zero or more objects, wherein at least one of the one or a series of sonar pings has a pseudo random frequency pattern, wherein the pseudo random frequency pattern is not a uniform frequency nor a monotonically increasing frequency nor a monotonically decreasing frequency;
  receiving sonar signals from the at least one of the one or a series of sonar pings reflected from the zero or more objects, wherein the sonar signals are received by a large array of hydrophones, and wherein each of the large array of hydrophones produces an analog voltage vs. time electrical signal, wherein the analog voltage vs. time electrical signal comprises a first set of raw data points which show the phase and the intensity of the sonar signal received by each of the large array of hydrophones;

generating convolution data in part by converting the first set of raw data points to a second set of raw data points, wherein the second set of raw data points consists of digital representations of only the phase of the sonar signals reflected from the zero or more objects and received by each hydrophone in the large array of hydrophones, wherein the second set of raw data points is a compressed data set relative to the first set of raw data points, in which each data point in the second set of raw data points is an n bit number indicative of the phase of the sonar signal for each hydrophone in the large array of hydrophones, characterized in that n is a positive integer less than 3, wherein the convolution data is generated in part by filtering high frequency components from each received sonar signal, selecting convolution windows from blocks of the received sonar signal, and sampling the blocks at known times relative to a corresponding sonar ping of the series of sonar pings;

beamforming, subsequent to the generation of the convolution data and by a beamformer of the sonar imaging device, only the second set of raw data points;

wherein the pseudo random frequency pattern is chosen from a set of predetermined pseudo random frequency patterns, wherein the set of predetermined pseudo random frequency patterns is generated by running computer models of pings of possible of frequency patterns impinging on various collections of objects at various ranges and angles with respect to an array detector for detecting sonar signals reflected from the various collections of objects, and then analyzing the model results and choosing the set of pseudo random frequency patterns according to a criterion based on the anticipated range of use and/or noise and/or processing power available.

2. The method of claim 1, wherein the criterion is that the convolution of a pseudo random frequency pattern of the insonifying sonar ping with the received sonar signal returns a convolution curve with a peak, wherein the area under the peak is greater than a determined area.

3. The method of claim 1, wherein one criterion is that the convolution curve returned by convolving sent out signals of one member of the set of chosen frequency patterns with received signals of another member of the same set has no peaks wherein the area under the peak is greater than a determined area.

4. The method of claim 1, wherein the criterion is that two reflectors having a determined difference in range are distinguishable.

5. The method of claim 3, wherein insonifying the volume of fluid further comprises:

insonifying the volume of fluid with at least two sonar pings, wherein the patterns of each of the at least two sonar pings are different patterns chosen from the set of pseudo random frequency patterns, and wherein the at least two sonar pings are sent out at such a time that reflected sonar signals from the at least two sonar pings arrive as overlapping signals at an array detector for detecting sonar signals.

* * * * *